March 15, 1927. 1,620,678
J. F. O'CONNOR
FRICTION SHOCK ABSORBING MECHANISM
Filed April 26, 1923  2 Sheets-Sheet 1
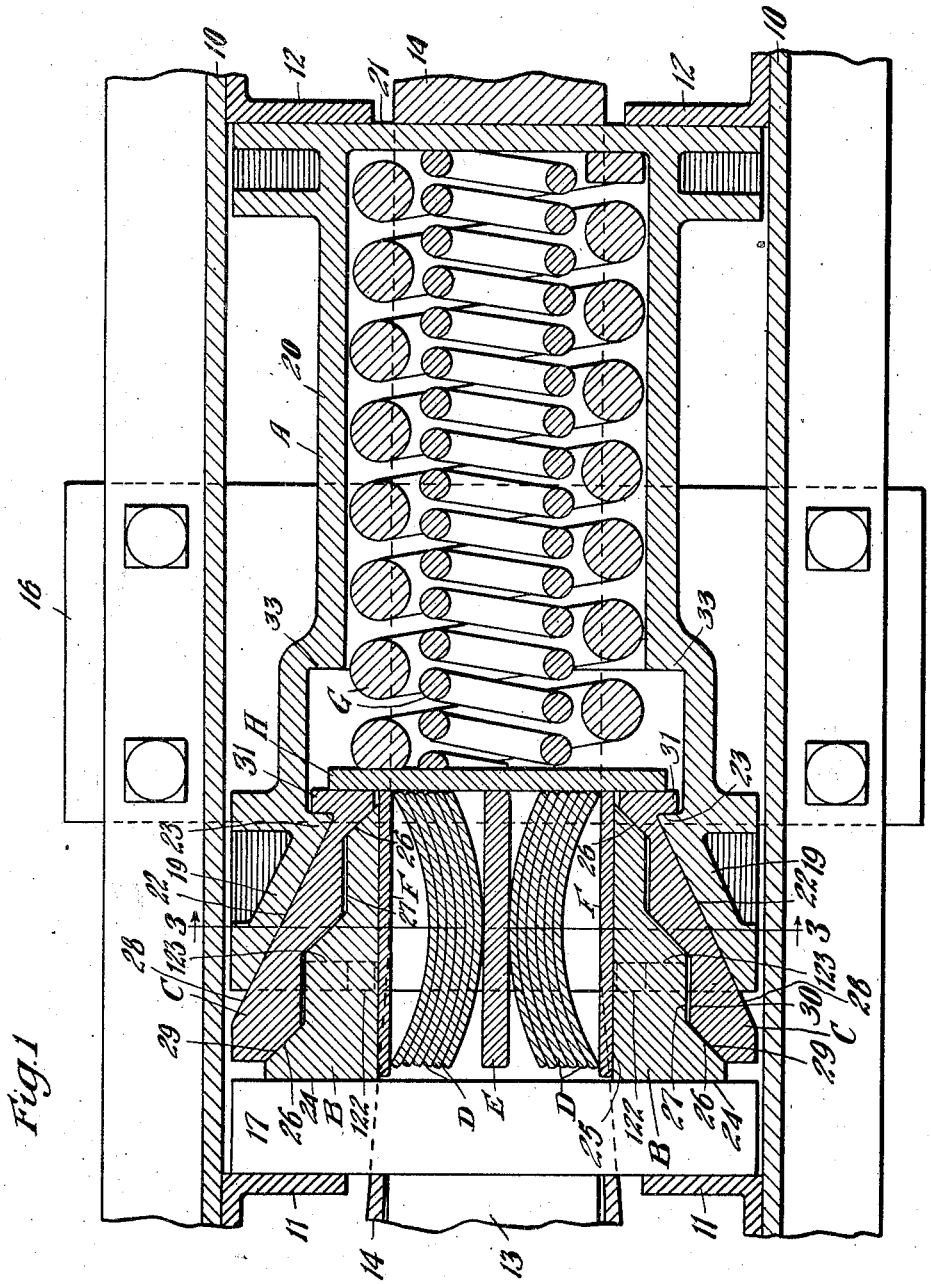

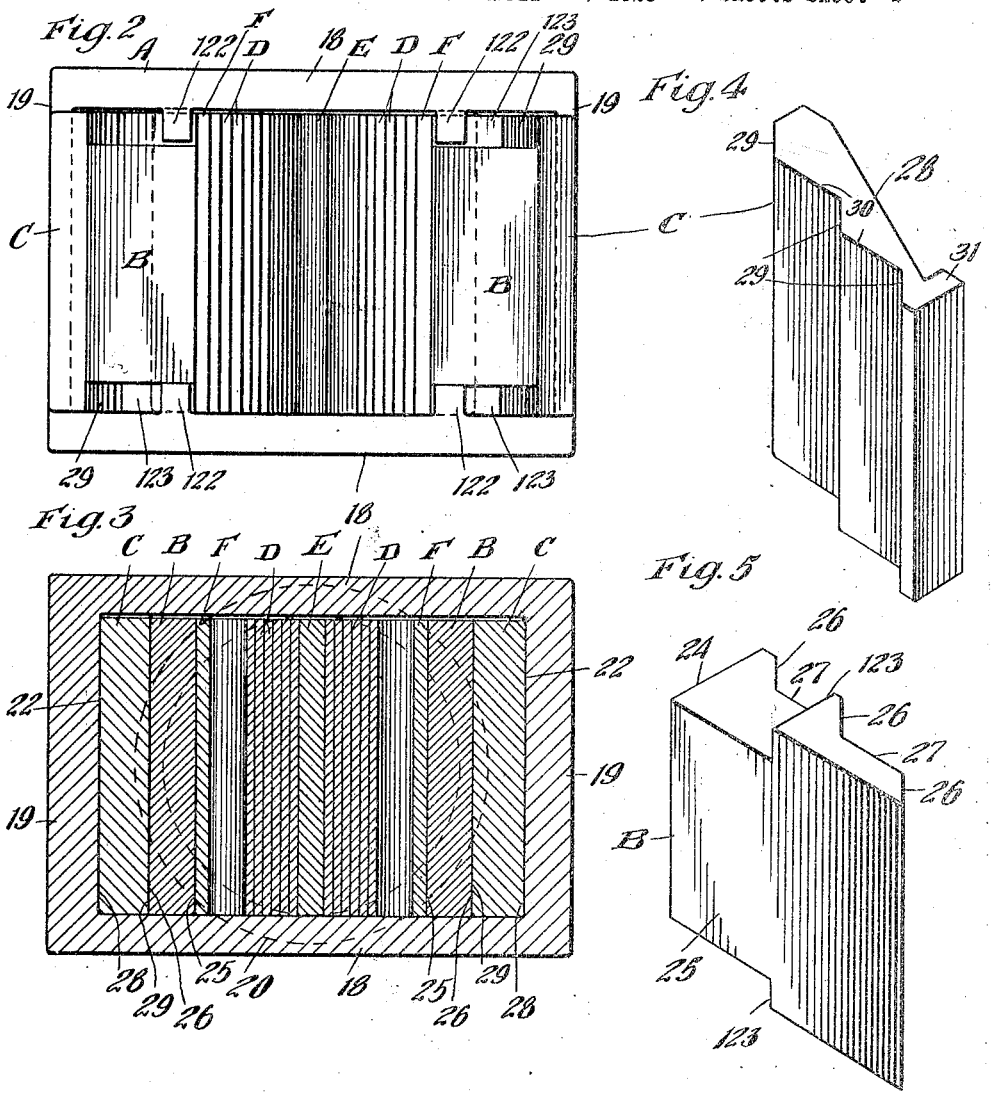

Patented Mar. 15, 1927.

1,620,678

UNITED STATES PATENT OFFICE.

JOHN F. O'CONNOR, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed April 26, 1923. Serial No. 634,693.

This invention relates to improvements in friction shock absorbing mechanisms.

One object of the invention is to provide a friction shock absorbing mechanism especially adapted for railway draft riggings, wherein are obtained high capacity and certain release.

More specifically, an object of the invention is to provide a mechanism of the character indicated, wherein is employed a compressible wedge composed of a plurality of parts so constructed as to produce a keen wedging effect, and a blunt releasing effect.

Other objects and advantages of the invention will more clearly appear from the description and claims hereinafter following.

In the drawings forming a part of this specification, Figure 1 is a horizontal, longitudinal, sectional view of a portion of a railway draft rigging showing my improvements in connection therewith. Fig. 2 is a front end elevation of the friction shock absorbing mechanism proper. Fig. 3 is a vertical, transverse, sectional view corresponding substantially to the line 3—3 of Fig. 1. Fig. 4 is a detailed perspective view of one of the wedge friction shoes. And Fig. 5 is a detailed perspective view of one of the pressure transmitting elements.

In said drawings, 10—10 indicate channel draft sills of the usual type, the same having front stop lugs 11 and rear stop lugs 12 secured to the inner faces thereof. The shock absorbing mechanism proper is operatively associated with a draw-bar, the inner end of which is indicated at 13, by means of a hooded cast yoke 14, said yoke and the parts therein being supported in operative position by a detachable saddle plate 16. A front follower 17 of ordinary form is employed with the shock absorbing mechanism proper.

The improved shock absorbing mechanism proper, as shown, comprises, broadly, a combined friction shell and spring cage casting A; a pair of pressure transmitting elements B—B; a pair of wedge friction shoes C—C; two sets of spring plates D—D; a spacing plate E; a pair of wear plates F—F; a spring resistance G; and a spring follower H.

The combined friction shell and spring cage casting A, as shown, is of rectangular cross-section at its outer or front end, the same having top and bottom walls 18—18 and side walls 19—19. Rearwardly of the friction shell portion of the casting defined by the walls 18 and 19, the same is made of reduced cross-section as indicated at 20 to provide the spring cage, having an integral rear wall 21 laterally extended to co-operate with the lugs 12 in the manner of the usual rear follower. The inner faces of the side walls 19—19 converge inwardly of the shell thereby providing wedge faces 22 extending at relatively keen angles with reference to the longitudinal axis of the mechanism. At the outer ends of the top and bottom walls the shell is provided with upwardly and downwardly projecting pairs of stop lugs 122, and at the inner ends of the wedge faces 22 the shell is formed with shoulders 23, for a purpose hereinafter described.

The pressure transmitting elements B are two in number, of like construction and arranged at opposite sides of the mechanism. The front ends of the pressure transmitting elements B are cut away at the top and bottom sides to provide transverse shoulders 123 adapted to co-act with the lugs 122 of the shell to limit the outward movement of the elements B. Each of the pressure transmitting elements B is provided with a flat front end face 24, a flat inner side face 25, a plurality of spaced wedge faces 26—26 connected by flat faces 27—27, the wedge faces 26 being arranged at relatively blunt angles with reference to the longitudinal axis of the mechanism. The front end faces 24 of the pressure transmitting elements are adapted to co-act with the flat rear face of the front follower and slide laterally thereon.

The wedge friction shoes C are two in number and of similar construction, one shoe being interposed between each of the pressure transmitting elements and the adjacent side wall 19 of the friction shell. Each of the wedge shoes C is provided with an outer flat face 28 similarly inclined to the wedge face 22 of the adjacent side wall of the friction shell and adapted to co-act therewith, a plurality of spaced inner wedge faces 29—29 connected by flat faces 30—30, the faces 29 being correspondingly inclined to the wedge faces 26 of the pressure transmitting element C and adapted to coact therewith. Each of the shoes C is also provided with a laterally extending flange 31 adapted to co-act with one of the shoulders 23 of the shell, thereby limiting the outward movement of the shoes.

The two sets of spring plates D are interposed between the opposite pressure transmitting elements B, and tend to yieldingly hold the same in separated relation. Each of the sets of spring plates D comprises a plurality of nested curved plates, as clearly shown in Fig. 1, bearing on the wear plates F abutting the flat faces 25 of the pressure transmitting elements B, and spaced apart by the centrally arranged spacing plate E.

The inner ends of the friction shoes are directly engaged by the spring follower plate H, co-acting with the spring resistance G interposed between the latter and the rear wall 21 of the spring cage. Inward movement of the follower plate H is limited by engagement of the follower 17, with the front walls of the casting A, thereby preventing the spring resistance G from being driven solid and transmitting the actuating force directly to the casting A. The spring resistance G is inserted under initial compression and normally holds the parts in the position shown in Fig. 1 with the flanges 32 of the friction shoes C in abutment with the shoulders 23 of the casting A.

The operation of the mechanism, assuming an inward or buffing movement of the draw-bar is as follows: As the follower 17 is moved inwardly toward the shell, the pressure transmitting elements B will be forced inwardly, thereby carrying the wedge shoes C therewith opposed by the resistance of the spring G, there being substantially no relative movement between the pressure transmitting elements B and the wedge friction shoes C due to the bluntness of the co-acting wedge faces 26 and 29, respectively, thereof. During the inward movement of the wedge system, as the wedge faces 28 of the shoes travel on the wedge faces 22 of the shell, there will be a simultaneous bodily movement of the shoes together with the elements B relatively toward each other transversely of the mechanism, thereby compressing the yielding means comprising the spring plates D. It will be evident that during this operation, in addition to the friction created between the wedge faces 22 and 28 of the shell and shoes, friction will also be created between faces 24 of the shoes and the inner surface of the front follower 17, as the shoes slide laterally thereon. This movement will continue until the compressing force is discontinued, or the shoes are arrested in their movement by engagement of the spring follower with the mouth of the casting A whereupon the force will be transmitted directly through the shell, preventing the spring from being driven solid.

Upon discontinuance of the compressing force the initial action will be a slight movement of the elements B laterally outwardly on the faces 29 of the shoes C, due to the expanding action of the spring means comprising the sets of plates D. This initial action is facilitated by the relative bluntness of the co-operating wedge faces 26 and 29 of the elements B and shoes C. As will be seen upon reference to Fig. 1 a slight clearance is left between the flat faces 27 of the elements B and the flat faces 30 of the shoes C, to permit of this movement. The wedging pressure on the faces 28 and 22 of the shoes and shell respectively is thus relieved, permitting the spring resistance G to restore all of the parts to normal position, as shown in Fig. 1, with the flanges 31 of the shoes C and the shoulders 123 of the elements B engaging the shoulders 23 and the lugs 122 of the shell, respectively. The faces 27 and 30 of the elements B and shoes C will be slightly spaced apart, as shown.

During draft, the operation of the mechanism is the reverse of that just described, the casting A being moved toward the front follower 17, which is held stationary.

In actual practice, when the parts are assembled the yielding means, comprising the sets of spring plates D—D is placed under initial compression, whereby compensation for wear on the engaging faces of the parts is had, a slight clearance being left between the outer edges of the flanges 31 of the shoes C and the shell to permit of this action.

I have herein shown and described what I now consider the preferred manner of carrying out the invention, but the same is merely illustrative and I contemplate all changes and modifications that come within the scope of the claims appended hereto.

I claim:

1. In a friction shock absorbing mechanism, the combination with a friction shell; of a spring resistance; and a multiple-part, compressible wedge unit, said unit and shell having co-acting friction surfaces disposed at a relatively keen wedge-acting angle with reference to the line of applied force said unit including a plurality of elements having engaging sets of faces disposed at relatively blunt releasing angles with reference to the line of applied compressing force, and resilient means compressible transversely of the applied force, interposed between certain of said elements and tending to hold said wedge unit expanded.

2. In a friction shock absorbing mechanism, the combination with a friction shell provided with interior wedge faces; of a spring resistance; a multiple part compressible wedge unit co-acting with said shell wedge faces, said wedge including a plurality of sets of co-acting members, and yielding means interposed between said sets tending to hold said wedge expanded, one member of each set being provided with wedge faces, some of said faces extending at relatively blunt angles and others at relatively keen angles with reference to the longitudinal axis of the mechanism.

3. In a friction shock absorbing mechanism, the combination with a friction shell provided with interior faces extending at relatively keen angles with reference to the longitudinal axis of the mechanism; of a spring resistance; a plurality of wedge shoes, said shoes being provided with a plurality of wedge faces, some of which are disposed respectively at relatively blunt angles with reference to said axis and others at relatively keen angles with reference to said axis, the keen angled faces thereof co-acting with the shell wedge faces; a plurality of pressure transmitting elements disposed between said wedge shoes; said elements being provided with blunt wedge faces adapted to co-act with the blunt wedge faces of said shoes; and resilient means interposed between said elements tending to hold them expanded.

4. In a friction shock absorbing mechanism, the combination with a friction shell provided with interior wedge faces; of a spring resistance; a plurality of pressure transmitting elements provided with wedge faces; resilient means for holding said elements separated; wedge shoes interposed between said elements and shell wedge faces and substantially co-extensive therewith; and co-acting means on said shell and shoes for limiting the outward movement of the latter relatively to the shell.

5. In a friction shock absorbing mechanism, the combination with a friction shell having interior wedge faces, extending at a relatively keen angle with reference to the longitudinal axis of the mechanism; of pressure transmitting wedge unit including a plurality of elements having wedge faces extending at relatively blunt angles with reference to said axis, means for yieldingly holding said elements separated, and a shoe interposed between each of said elements and the shell, said shoes having wedge faces correspondingly inclined to the wedge faces of the said elements and shell, respectively; a spring resistance co-operating with said wedge unit; and a spring follower interposed between the inner ends of said shoes and said spring resistance.

6. In a friction shock absorbing mechanism, the combination with a friction shell having a pair of inwardly converging wedge faces on the interior thereof; of a wedge unit including a pair of pressure transmitting elements provided with wedge faces, resilient means interposed transversely between said elements, and a pair of friction shoes interposed between said elements and shell wedge faces, said shoes having wedge faces co-acting respectively with the wedge faces of the shell and elements; and means for yieldingly resisting movement of said shoes inwardly of the shell.

7. In a friction shock absorbing mechanism, the combination with a friction shell having a pair of inwardly converging wedge faces on the interior thereof, said wedge faces extending at a relatively keen angle with reference to the longitudinal axis of the mechanism; of a wedge unit including a pair of pressure transmitting elements, having wedge faces extending at a relatively blunt angle with reference to said axis, means for yieldingly holding said elements separated, and wedge shoes interposed between each element and the shell wedge faces, each of said shoes having a face correspondingly inclined to the wedge face of the shell and co-acting therewith and wedge faces correspondingly inclined to the wedge faces of one of said elements and co-acting therewith; and cooperating spring means resisting movement of said shoes inwardly of the shell.

8. In a friction shock absorbing mechanism, the combination with a friction shell, having interior wedge faces, extending at relatively keen angles with reference to the longitudinal axis of the mechanism; of wedge shoes having wedge faces correspondingly inclined to the wedge faces of said shell, and having interior wedge faces disposed at relatively blunt releasing angles with reference to said axis; pressure transmitting elements having wedge faces corresponding to the blunt wedge faces of said wedges; yielding means for spreading said elements; and a main spring resistance.

9. In a friction shock absorbing mechanism, the combination with a friction shell provided with interior faces, extending at relatively keen angles with reference to the longitudinal axis of the mechanism; of a spring resistance; a plurality of wedge shoes, each of said shoes being provided with a keen wedge face adapted to cooperate with one of said shell faces; and a plurality of spaced wedge faces, disposed at relatively blunt releasing angles with reference to said axis; a plurality of pressure transmitting elements provided with blunt wedge faces adapted to coact with the blunt wedge faces of said shoes, said elements being arranged to have limited relative movement with reference to said wedge shoes during release; and resilient means for holding said elements expanded.

10. In a friction shock absorbing mechanism, the combination with a friction shell having interior wedge faces converging inwardly, longitudinally of the mechanism; of pressure transmitting elements having faces disposed at an angle to the wedge faces of the shell; resilient means compressible transversely of the mechanism, said resilient means being interposed between the pressure transmitting elements and tending to hold the same separated; friction shoes having faces co-acting with said shell faces and the faces of said elements; and yielding means resisting movement of said shoes inwardly of the shell.

11. In a friction shock absorbing mechanism, the combination with a combined friction shell and spring cage, said friction shell having inwardly converging flat surfaces; of a friction unit co-operating with the shell, said unit including a pair of friction elements having flat surfaces correspondingly inclined to said shell surfaces and co-operating therewith; a pair of pressure transmitting elements, each of said pressure transmitting elements and friction elements having co-operating faces converging inwardly of the mechanism at a different angle than said first named surfaces; and yielding means interposed between said pressure transmitting elements comprising curved spring plates; and a spring resistance within said cage opposing inward movement of said friction unit.

12. In a friction shock absorbing mechanism, the combination with a spring cage casting having a friction shell section at the front end thereof, said friction shell section being provided with opposed inwardly converging surfaces; of a pair of friction shoes co-operating with the opposed surfaces of the shell section; a pair of pressure transmitting elements, each of said elements and one of said friction shoes having interengaging co-operating sets of surfaces converging inwardly of the mechanism and disposed at a blunter angle with respect to said axis than the surfaces of said shell section; yielding means resisting lateral approach of said pressure transmitting elements, said means being interposed therebetween; and a spring resistance within said cage yieldingly opposing movement of said pressure transmitting elements.

13. In a friction shock absorbing mechanism, the combination with a friction shell having inwardly converging opposed friction surfaces adjacent one end thereof; of a pair of friction shoes co-operating with said opposed shell surfaces and having faces correspondingly inclined to said shell surfaces; a pair of pressure transmitting elements co-operating respectively with said shoes, each of said shoes and the corresponding pressure transmitting element having co-operating surfaces converging inwardly of the mechanism and disposed at a blunter angle with respect to said axis than the shell surfaces; two sets of curved spring plates interposed between said pressure transmitting elements; and means within the shell yieldingly resisting movement of said shoes and pressure transmitting elements.

14. In a friction shock absorbing mechanism, the combination with a combined spring cage and friction shell, the friction shell thereof having inwardly converging opposed surfaces; a pair of friction shoes provided with friction surfaces co-operating with said shell surfaces, said shell and shoes having co-operating transverse abutment faces for limiting outward movement of the shoes; a pair of pressure transmitting elements, said elements and shoes having co-operating surfaces converging inwardly; yielding means interposed between said pressure transmitting elements resisting lateral approach thereof; and a main spring resistance opposing inward movement of said pressure transmitting elements and shoes.

15. In a friction shock absorbing mechanism, the combination with a shell having opposed friction surfaces adjacent the front end thereof, said surfaces converging inwardly of the mechanism, said shell and shoes having co-operating shoulders for limiting the outward movement of said shoes; a pair of pressure transmitting elements disposed at opposite sides of the mechanism and co-operating respectively with the shoes, said shoes and pressure transmitting elements having co-operating faces converging inwardly of the mechanism; means for limiting the outward movement of said pressure transmitting elements; a plurality of spring plates interposed between said pressure transmitting elements yieldingly opposing lateral approach of the latter; and means yieldingly resisting inward movement of said pressure transmitting elements and shoes.

16. In a friction shock absorbing mechanism, the combination with a shell having opposed, inwardly converging faces at one end thereof; a pair of shoes co-operating with said opposed surfaces; a pair of wedge blocks co-operating with said shoes; two sets of curved spring plates interposed between said wedge blocks and resisting lateral approach thereof; a main spring resistance opposing inward movement of said wedge blocks and shoes; and a spring follower interposed between said spring resistance and said wedge blocks, said spring follower forming an abutment for the inner ends of said sets of spring plates.

17. In a friction shock absorbing mechanism, the combination with a substantially rectangular cage provided at one end thereof with laterally opposed inwardly converging wedge faces disposed at a relatively keen angle to the longitudinal axis of the mecha-